2

United States Patent Office 3,823,187
Patented July 9, 1974

3,823,187
PRODUCTION OF L(—)-γ-AMINO-
α-HYDROXYBUTYRIC ACID
Takayuki Naito and Susumu Nakagawa, Tokyo, Japan,
assignors to Bristol-Myers Company, New York, N.Y.
No Drawing. Filed June 19, 1972, Ser. No. 264,105
Int. Cl. C07c 99/00
U.S. Cl. 260—534 M                    1 Claim

ABSTRACT OF THE DISCLOSURE

An improved process for the preparation of L(—)-γ-amino - α - hydroxybutyric acid comprises conversion of L(+)-glutamic acid by reaction with nitrous acid to γ-carboxy-γ-butyrolacetone which is reacted with ammonia to produce L-2-hydroxy-glutaramic acid which is reacted with sodium hypochlorite to produce L(—)-γ-amino-α-hydroxybutyric acid with retention of configuration.

BACKGROUND OF THE INVENTION (1) Field of the Invention.—This invention provides improved chemical processes for the production of L(—)-γ-amino-α-hydroxybutyric acid.

(2) Description of the Prior Art.—The kanamycins are known antibiotics which are described in Merck Index, Eighth Edition, pp. 597 and 598.

A derivative of the kanamycins having significant antibiotic properties is the 1-substituted derivative wherein the 1-amino function is acylated with L(—)-γ-amino-α-hydroxybutyric acid. These compounds have the following structure.

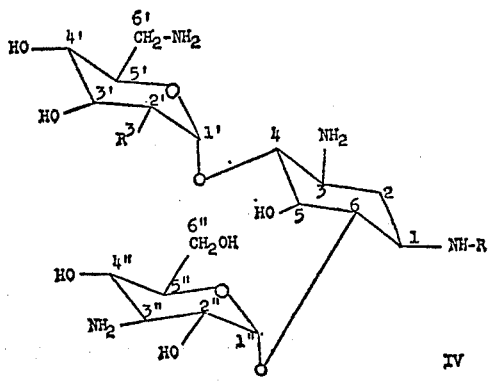

in which $R^3$ is OH or $NH_2$ and R is L-(—)-γ-amino-α-hydroxybutryl.

These compounds (IV) can be prepared according to the following reaction scheme as disclosed in the application of ourselves and our colleague, Hiroshi Kawaguchi, filed Jan. 27, 1972 as U.S. Ser. No. 221,378.

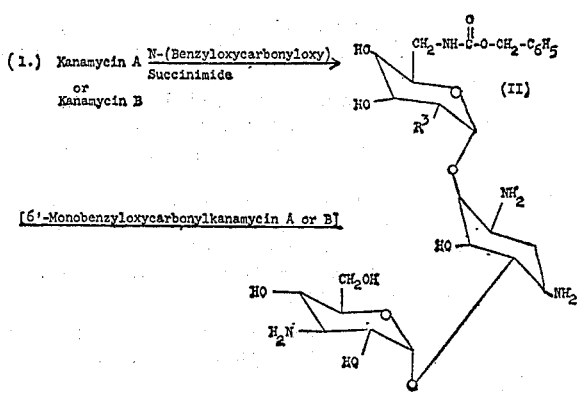

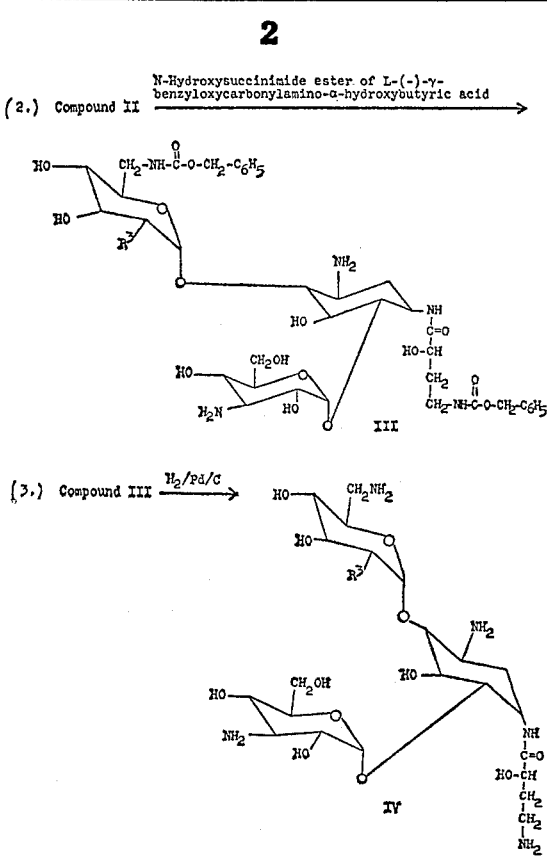

It will be appreciated that the preparation of L(—)-γ-benzyloxycarbonylamino-α-hydroxybutyric acid is an important step in the process for preparing the final compounds of formula IV and similarly that L(—)-α-amino-α-hydroxybutyric acid is an important intermediate in the overall synthesis of compound IV.

L(—)-γ-amino-α-hydroxybutyric acid is also found in the molecular structure of the antibiotic known as ambutyrosin which is disclosed in U.S. Patent 3,541,078 and further discussed by Woo et al. in Tetrahedron Letters, No. 28, pp. 2617–2620, 1971.

The DL racemic mixture of γ-amino-α-hydroxybutyric acid can be prepared chemically by a method described by Saito et al., Tetrahedron Letters, 1970, 4863. The racemic mixture can also be resolved using dehydroabietylamine as the resolving agent.

Various publications concerning the reaction of L(+)-glutamic acid with hydrazoic acid to produce L(+)-α,γ-diaminobutyric acid have reported that the reaction did not affect the carboxyl group attached to the asymmetric carbon atom. Recently G. I. Tesser and J. W. von Nispen [Synthetic Commun., 1, 285 (1971)] reported an improved procedure for this reaction.

The conversion of L(+)-α,γ-diaminobutyric acid into L(—)-γ-amino-α-hydroxybutyric acid was reported by Woo et al. (ibid.). The deamination of L-ornithine with nitrous acid to give L(—)-α-hydroxy-δ-amino-n-valeric acid was described by S. Oshiro et al., Yakugaku Zasshi (J. Pharm. Soc. Japan) 87, 1184 (1967).

The conversion of L-glutamic acid to γ-carboxy-γ-butyralacetone having the structure

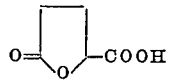

by nitrous acid deamination was reported to proceed with full retention of configuration by K. Koga et al., Tetrahedron Letters, No. 3, 263–266 (1971). A similar conversion of DL-glutamic acid was reported by H. Plieninger, Chem. Ber., 94, 2106–2114 (1961); see page 2111.

SUMMARY OF THE INVENTION

It was found according to the present invention that L(−)-γ-amino-α-hydroxybutyric acid, the side chain acid of kanamycin derivative IV above, can be readily prepared from L(+)-glutamic acid by the following process:

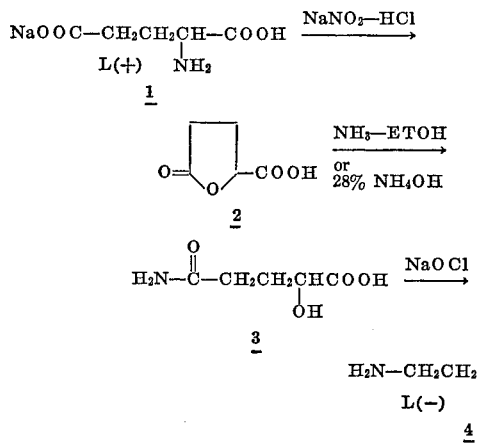

This process is of practical use because the starting material, L-glutamic acid, is readily available at low prices (the sodium salt is on the market as a condiment), the process comprises only three steps, all of the reagents used in each of the steps are inexpensive, their use is not hazardous and no optical resolution process is required due to the stereospecific reactions involved.

DESCRIPTION OF THE PREFERRED EMBODIMENT

Example

γ-Carboxy-γ-butyrolactone (2)

To a stirred solution of 38 g. (0.2 mole) of monosodium L(+)-glutamate(hydrate) (1) in 80 ml. of water and 50 ml. of concentrated hydrochloric acid was added slowly over 30 min. 21 g. (0.3 mole) of sodium nitrite in 45 ml. of water at 0–5°. The reaction mixture was stirred for 3 hr., allowed to stand overnight at 5–10° and evaporated under reduced pressure. The residue was shaken with 100 ml. of ethyl acetate and filtered. The filter cake was washed twice with 50 ml. of ethyl acetate. The filtrate and the washings were combined and evaporated under reduced pressure to leave an oil, which was transferred to a 30 ml. distillation flask, heated at 120° under reduced pressure to remove water and nitrous gas and distilled in vacuo to yield 16.61 g. (64%) of γ-carboxy-γ-butyrolactone (2): b.p. 155–160° (0.5 mm. Hg); m.p. 62–64°; [α]$_D^{22}$ −3.8° (c. 2.5, H$_2$O).

L-2-Hydroxyglutaramic acid (3)

(a) With ethanolic ammonia—Ammonia gas was passed into a chilled solution of 6 g. (0.064 mole) of γ-carboxy-γ-butyrolactone (2) in 50 ml. of ethanol until the gas saturated the solution. The flask was tightly stoppered and allowed to stand overnight at room temperature. About 10 ml. of water was added to the reaction mixture, which was evaporated under reduced pressure. The residual oil was dissolved in 50 ml. of water and that solution was passed through a column of "Amberlite IR–120" resin (H+ type, 70 ml.), which was developed with water. The acidic effluent below pH 4 was collected (ca. 300 ml.) and evaporated under reduced pressure to give colorless crystals, which were collected by filtration and washed with ethanol to yield 6.09 g. of L-2-hydroxyglutaramic acid (3) (90%); m.p. 120–122°. Crystallization from ethanol-water gave an analytical sample, m.p. 124–125°, [α]$_D^{25}$ +1.0° (c. 2.5, H$_2$O).

Anal. Calcd. for C$_5$H$_9$NO$_4$: C, 40.81; H, 6.17; N, 9.52. Found: C, 40.67; H, 6.18; N, 9.50.

(b) With 28% aqueous ammonia—To a stirred 30 ml. of 28% ammonia water was added 3 g. (0.023 mole) of γ-carboxy-γ-butyrolactone (2) in several portions at room temperature. The reaction mixture was stirred overnight and evaporated under reduced pressure to afford a syrup which was dissolved in 30 ml. of water, passed through a column of "Amberlite IR–120" resin (H+ type, 50 ml.) and washed with water. The acidic effluent below pH 4 was collected (ca. 200 ml.) and evaporated under reduced pressure to give colorless crystals, which were mixed with 10 ml. of ethanol and then collected by filtration to give 2.13 g. (63%) of L-2-hydroxyglutaramic acid (3): m.p. 123–124°, [α]$_D^{25}$ +1.2° (c. 2.5, H$_2$O). Evaporation of the filtrate gave the second crop of (3), 0.57 g. (17%): m.p. 119–120°, [α]$_D^{25}$ +1.0° (c. 2.5, H$_2$O). Total yield 2.70 g. (80%).

L(−)-4-Amino-2-hydroxybutyric acid (4); also named as L(−)-γ-Amino-α-hydroxybutyric acid Chlorine gas generated by the action of 18 ml. of concentrated hydrochloric acid on 1.62 g. (0.0102 mole) of potassium permanganate was introduced into 100 ml. of a chilled 10% sodium hydroxide solution. To that sodium hypochlorite solution there was added 1.47 g. (0.01 mole) of L-2-hydroxyglutaramic acid (3). The mixture was stirred for 20 min. at room temperature and then 2.5 hr. at 50°, acidified with concentrated hydrochloric acid (pH 4), diluted with 50 ml. of water and adsorbed on a colum of "Amberlite IR–120" resin (H+ type, 200 ml.). The column was washed with water until pH of the washings beame 5, and eluted with 1 N aqueous ammonia. The eluate was collected in 20-ml. fractions. The ninhydrin positive fractions 10 to 13 were combined, and evaporated under reduced pressure to give a slightly colored oil which was crystallized from ca. 3 ml. of water and ca. 5 ml. of ethanol. The crystals were filtered and dried in vacuo over phosphorus pentoxide to yield 0.83 g. L(−)-4-amino-2-hydroxybutyric acid (4) (70%), m.p. 212–213°, [α]$_D^{23.5}$ −33.4° (c. 2.5, H$_2$O).

"Amberlite IR–120" is a commercially available cation exchange resin of the polystyrene sulfonic acid type; it is thus a nuclear sulfonated polystyrene resin cross-linked with divinyl benzene obtained by the procedure given by Kunin, Ion Exchange Resins, 2nd Ed. (1958), John Wiley and Sons, Inc. Therein see pages 84 and 87 for example. Available from Rohm and Haas, Washington Square, Philadelphia, Pa., U.S.A.

The hypochlorite used above is a source of active halogen; equivalents are well-known and include chlorine, bromine and hypobromites.

We claim:
1. The process which comprises the consecutive steps of adding a cold, aqueous solution of sodium nitrite slowly to a solution of L-glutamic acid in aqueous hydrochloric acid to produce γ-carboxy-γ-butyrolactone which is isolated and then reacted with ammonia in water or ethanol to produce L-2-hydroxyglutaramic acid which is isolated and then added to an aqueous solution of sodium hypochlorite to produce optically pure L(−)-γ-amino-α-hydroxybutyric acid.

References Cited

Koga et al., Tetrahedron Letters, No. 3, pp. 263–266 (1971).

LORRAINE A. WEINBERGER, Primary Examiner

R. D. KELLY, Assistant Examiner

U.S. Cl. X.R.

260—345.7, 345.8, 343.6